June 18, 1929.   J. F. McGHEE   1,718,056
FRUIT CLEANING MACHINE
Filed Oct. 12, 1927   3 Sheets-Sheet 3

INVENTOR:
James F. McGhee
BY
A. V. Jouzy
ATTORNEY

Patented June 18, 1929.

1,718,056

UNITED STATES PATENT OFFICE.

JAMES F. McGHEE, OF MOORESTOWN, NEW JERSEY, ASSIGNOR TO AMERICAN MACHINERY CORPORATION, OF PHILADELPHIA, PENNSYLVANIA, A CORPORATION OF PENNSYLVANIA.

FRUIT-CLEANING MACHINE.

Application filed October 12, 1927. Serial No. 225,670.

The object of this invention is to provide a novel, simple and efficient machine for breaking or separating and washing figs and similar fruit which is usually received in a closely packed and caked condition requiring the caked mass to be broken and the figs or other fruit thereof to be separated and washed before use.

With the foregoing object in view, the invention consists of the elements and the combination of them hereinafter described and claimed.

In the accompanying drawings illustrating the invention,

Figure 4 is a top view of a part of the feeding table showing the fruit stripping arms thereon.

Figure 1:
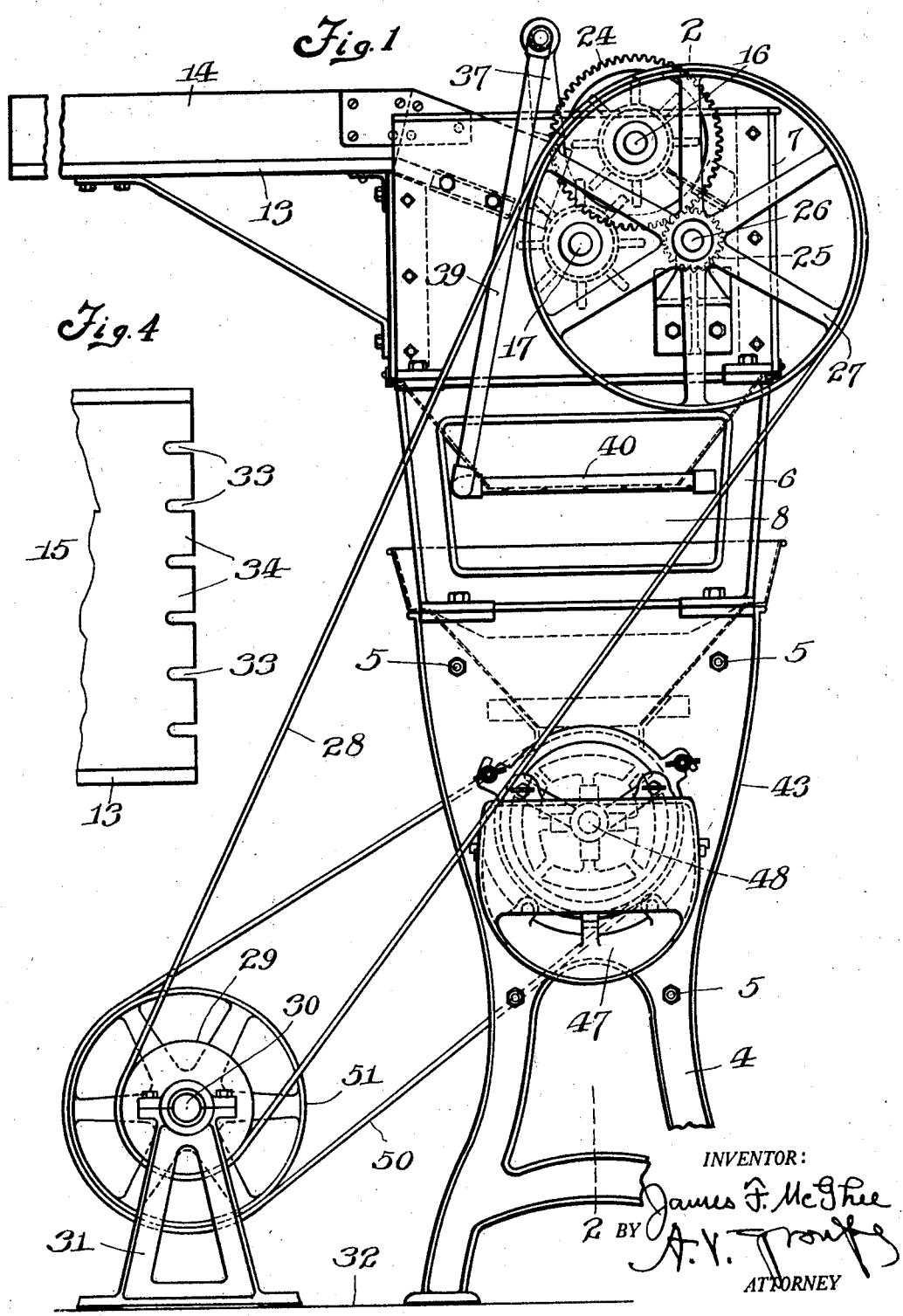
Figure 1 is a side view, partly broken away, of a fruit cleaning machine embodying the invention.

Referring to the drawings, the frame structure of the machine includes two lower side standards 4 connected by tie rods 5, intermediate side frames 6 resting upon and secured to the standards 4 and a box-like top frame 7 resting upon and secured to the side frames 6 and having an open top and an open bottom.

Figure 2:
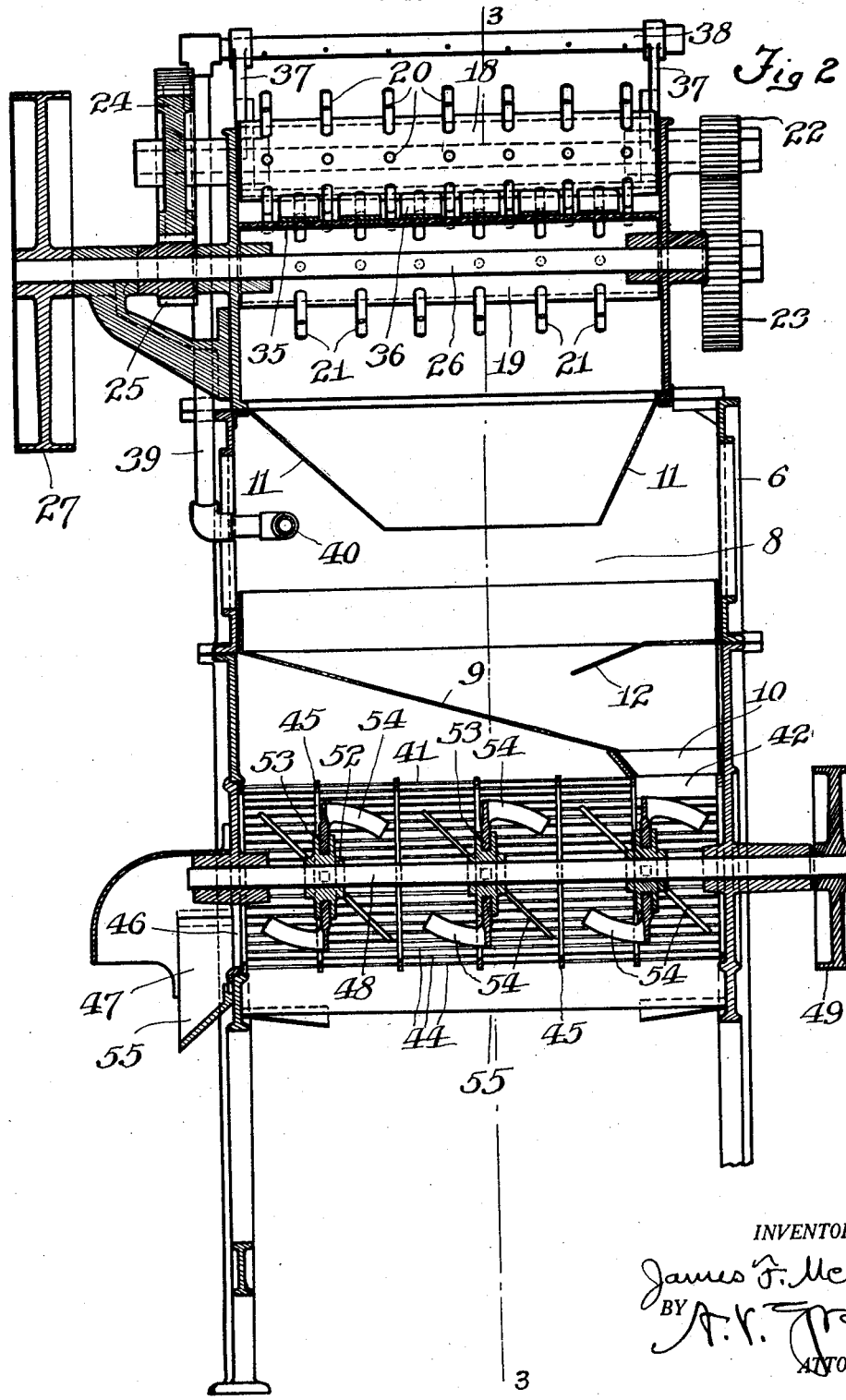
Figure 2 is a vertical section thereof, on line 2—2 of Fig. 1.

The frame structure encloses a downwardly directed fruit passage 8 which extends through the top frame 7 and between the side frames 6 and side standards 4 and terminates at its lower end in an inclined bottom or floor portion 9 and a discharging outlet 10 at the lower end of the inclined bottom 9, as clearly shown in Fig. 2. The passage 8, between the top frame 7 and the bottom 9, is interrupted by downwardly and inwardly directed baffle plates 11 and 12, as shown in Figs. 2 and 3, which interrupt fruit falling through the passage 7 and direct it toward the central portion of the incline bottom 9.

Extending outwardly from one side of the top frame is a feed table 13 having side plates 14 between which the fruit to be cleaned is placed upon the table. The inner end portion of the table 13 terminates in a downwardly inclined portion 15 which extends into the fruit passage 8 within the top frame 7.

Journaled in bearings on opposite sides of the top frame 7 are parallel shafts 16 and 17 carrying breaking cylinders 18 and 19 which are spaced one above the other and which are provided with radially projecting breaker arms 20 and 21, respectively. One end of the upper shaft 16, outwardly of the top frame 7, is provided with a pinion 22 in mesh with a gear wheel 23 on the lower shaft 17; and the other end of the upper shaft 16 is provided with a gear wheel 24 in mesh with a pinion 25 on a driving shaft 26 which is mounted to turn in bearings on the top frame 7. This shaft 26 is provided with a pulley 27 which is driven by a belt 28 from a pulley 29 from the main driving shaft 30 which turns in bearings 31 on the floor 32 or other support for the frame standards 4.

Figure 3:
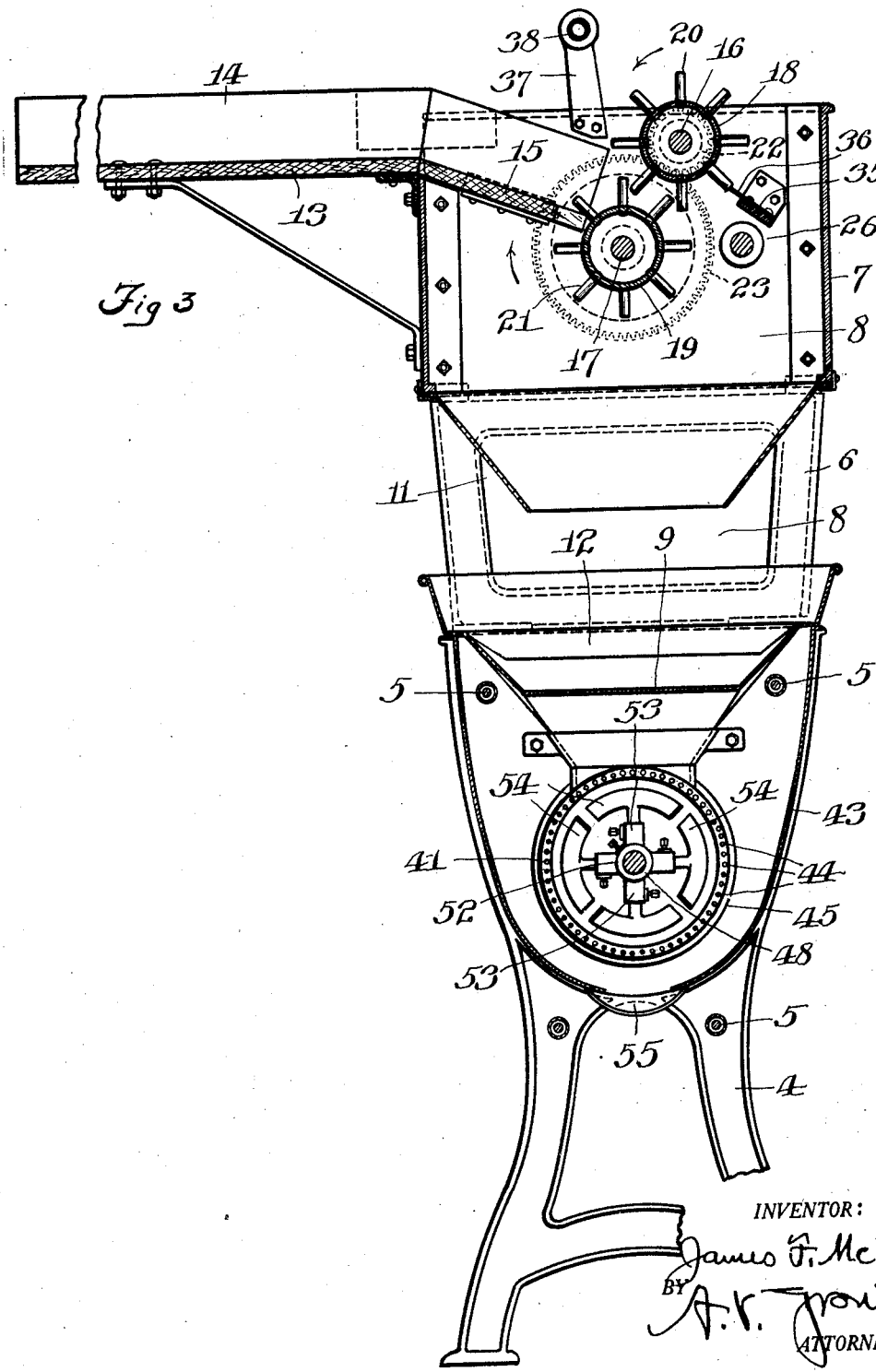
Figure 3 is a vertical section thereof, on line 3—3 of Fig. 2.

It will now be understood that when the main shaft 30 is driven by power the breaking cylinders 18 and 19 will be rotated in the directions indicated by the arrows in Fig. 3, and that the upper cylinder 18 will be driven at a higher rate of speed than the lower cylinder 19.

The breaker arms of each cylinder 18 and 19 are arranged in laterally spaced circular sets or series alternating with the circular sets or series of the other cylinder, so that the sets of breaker arms of each cylinder will rotate through paths which alternate with and which are laterally adjacent to the paths of the sets of breaker arms of the other cylinder.

The lower or inner end of the inclined portion 15 of the feed table 13 terminates in close proximity to the lower breaking cylinder 19 and is arranged to deliver the fruit to be cleaned to the upper portion of the lower cylinder and to the space between the two cylinders 18 and 19. The lower end portion of the inclined portion 15 of the feed table has slots or openings 33 therein for the passage therethrough of the breaker arms 21 of the lower cylinder 19. These slots 33 provide stationary stripping arms 34 between the paths of the sets of breaker arms 21 to strip therefrom any fruit which may stick thereto as the arms pass upwardly through the slots 33. The top frame 7 has a bar 35 secured therein which extends through the same parallel to the cylinder 18 and which is provided with stripping arms 36 which extend therefrom and into the spaces between the paths of the sets of breaker arms 20. These arms 36 are provided to strip from the arms 20 any fruit which may stick thereto as the arms 20 pass upwardly through the spaces between the stripping arms 36.

Supported by brackets 37 on the top frame 7 is a water pipe 38 which extends horizontally above the lower breaking cylinder 19 and above the lower portion of the inclined portion 15 of the feed table, and which is provided with a row of spaced perforations in the bottom thereof for the discharge of water on to the fruit being delivered to the breaking cylinders 18 and 19. This pipe 38 is constructed to be connected to a suitable source of water supply and it is provided with an extension 39 which terminates in a horizontal portion 40 located above the upper portion of the inclined bottom 9 of the passage 8, and the horizontal portion 40 has a row of spaced perforations in the bottom thereof for the discharge of water on to the inclined bottom 9.

The outlet 10 at the bottom of the fruit passage 8 communicates with the intake end of a horizontally arranged, cylindrical grating 41 through an inlet 42 in the top of the intake end of the grating. The grating 41 extends between and is suitably supported by the side standards 4 and it is located within and spaced from the walls of a casing 43 which extends between and is supported by the side standards 4. The grating 41 comprises a circular series of parallel bars or rods 44 held in suitable spaced relation at intervals throughout the length thereof by rings 45. The discharge end of the grating 41 is provided with an outlet in the form of an opening 46 in the standard 4 supporting the discharge end of the grating 41, and this standard is provided with a spout 47 which surrounds the opening 46 for discharging cleaned fruit from the machine.

Extending axially through the grating 41 is a shaft 48 which turns in bearings on the standards 4. One end portion of the shaft 48 extends outwardly and carries a pulley 49 which is driven by a belt 50 from a pulley 51 on the main driving shaft 30. That portion of the shaft 48 which extends through the grating 41 is provided with a series of spaced collars 52 having radially projecting arms 53 carrying inclined plates or blades 54 on their free ends, as shown in the drawings. These plates or blades 54 are constructed and arranged to engage fruit entering the grating 41 through the inlet 42 and rotate and agitate the fruit and advance it through the grating and discharge it therefrom through the spout 47.

The operation of the machine is as follows:

Power is applied to the main driving shaft 30 causing the rotation of the breaking cylinders 18 and 19 and the rotation of the shaft 48 and therewith the feeders and agitators 54 at a much higher speed than the speed of the breaking cylinders. Water is supplied to the pipes 38 and 40 and it falls from the pipe 38 down upon the lower end of the inclined portion 15 of the feed table and upon the breaker arms 21 and flows down through the fruit passage 8 to the inclined bottom 9 thereof over which it flows to and through the intake end of the grating 41 and thence out through an opening 55 in the bottom of the casing 43 from which it may descend to the inlet of a suitable drain passage beneath the machine. The water from the pipe 40 flows down upon the upper portion of the inclined bottom 9 and then down over the bottom 9 and joins the water delivered by the pipe 38.

The chunks or pieces of caked figs or other fruit to be cleaned are placed upon the feed table 13 and pushed by hand over the same and down over the inclined portion 15 of the table to the breaking cylinder 19 where they are met by the breaker arms of one or both cylinders 18 and 19 and carried thereby between the two cylinders where the action of the breaker arms 20 and 21 breaks up the chunks of figs and separates them from one another. During this feeding and breaking operation, water from the pipe 38 is flowing over and through the fruit and washing particles of dirt and foreign matter therefrom and wetting and loosening other particles of dirt. From the cylinders 18 and 19 the figs fall down through the passage 8 to the inclined bottom 9 thereof, and, during the descent of the figs, then engage the baffle plates 11 and 12 which assist in separating the figs and direct them to the central portion of the bottom 9. When the figs reach the inclined bottom 9 they pass down over the same partly by gravity and partly by the urge of the water flowing over the bottom 9 from the pipes 38 and 40, and the washing operation continues as the figs pass over the bottom 9 and from the lower end thereof into the intake end of the grating 41. After the figs enter the grating 41 they are engaged by the blades or plates 54 and are thereby agitated and rotated within the grating and advanced through the same and discharged through the spout 47 into a suitable receptacle which may be placed beneath the spout. As the wet figs pass through the grating 41, the agitation and rotation thereof loosens any dirt particles which may tend to stick to the figs and which have been loosened by the water and such particles are separated from the fruit by centrifugal and other forces and they are discharged from the grating through the spaces between the bars 44 thereof and are carried off by the water flowing through the machine while the fruit is delivered through the spout 47 in the desired clean condition.

I claim as my invention:

1. The combination of a frame structure having a cylindrical grating in the lower portion thereof and a downwardly directed fruit passage in the upper portion thereof discharging at its lower end into the grating, means in the upper portion of the passage for breaking caked fruit introduced thereto, means for agitating fruit within and advancing it within the surrounding grating longitudinally thereof, and means for introducing water to the passage.

2. The combination of a frame structure having a cylindrical grating in the lower portion thereof and a downwardly directed fruit passage in the upper portion thereof discharging at its lower end into the grating, means in the upper portion of the passage for breaking caked fruit introduced thereto, means for agitating fruit within and advancing it within the surrounding grating longitudinally thereof, means for introducing water to the passage above the breaking means therein, and means for introducing water to the passage between the breaking means and the grating.

3. The combination of a frame structure having a cylindrical grating in the lower portion thereof and a downwardly directed fruit passage in the upper portion thereof discharging at its lower end into the grating, means in the upper portion of the passage for breaking caked fruit introduced thereto, means for agitating fruit within and advancing it within the surrounding grating longitudinally thereof, inclined baffle plates within the passage between the breaking means and the grating, and means for introducing water to the passage.

4. The combination of a frame structure having a cylindrical grating in the lower portion thereof and a downwardly directed fruit passage in the upper portion thereof discharging at its lower end into the grating, means in the upper portion of the passage for breaking caked fruit introduced thereto, means for agitating fruit within and advancing it within the surrounding grating longitudinally thereof, inclined baffle plates within the passage between the breaking means and the grating, means for introducing water to the passage above the breaking means therein, and means for introducing water to the passage between the breaking means and the grating.

5. The combination of a frame structure having a cylindrical grating in the lower portion thereof and a downwardly directed fruit passage in the upper portion thereof discharging at its lower end into the grating, two spaced breaking cylinders in the upper portion of the passage, each cylinder being provided with breaker arms projecting radially therefrom and spaced to rotate through paths alternating with and laterally adjacent to the paths of the arms of the other cylinder, means for rotating said cylinder, means for agitating fruit within and advancing it within the surrounding grating longitudinally thereof, and means for introducing water to the passage.

6. The combination of a frame structure having a cylindrical grating in the lower portion thereof and a downwardly directed fruit passage in the upper portion thereof discharging at its lower end into the grating, two spaced breaking cylinders in the upper portion of the passage, each cylinder being provided with breaker arms projecting radially therefrom and spaced to rotate through paths alternating with and laterally adjacent to the paths of the arms of the other cylinder, means for rotating said cylinders at different relative speeds, means for agitating fruit within and advancing it within the surrounding grating longitudinally thereof, and means for introducing water to the passage.

7. The combination of a frame structure having a cylindrical grating in the lower portion thereof and a downwardly directed fruit passage in the upper portion thereof discharging at its lower end into the grating, two spaced breaking cylinders in the upper portion of the passage, each cylinder being provided with breaker arms projecting radially therefrom and spaced to rotate through paths alternating with and laterally adjacent to the paths of the arms of the other cylinder, means for rotating said cylinders, stationary stripping arms extending into the spaces between the breaker arms of each cylinder, means for agitating fruit within and advancing it within the surrounding grating longitudinally thereof, and means for introducing water to the passage.

8. The combination of a frame structure having a cylindrical grating in the lower portion thereof and a downwardly directed fruit passage in the upper portion thereof discharging at its lower end into the grating, two spaced breaking cylinders in the upper portion of the passage, each cylinder being provided with breaker arms projecting radially therefrom and spaced to rotate through paths alternating with and laterally adjacent to the paths of the arms of the other cylinder, means for rotating said cylinders at different relative speeds, stationary stripping arms extending into the spaces between the breaker arms of each cylinder, means for agitating fruit within and advancing it within the surrounding grating longitudinally thereof, and means for introducing water to the passage.

9. The combination of a frame structure having a cylindrical grating in the lower portion thereof and a downwardly directed fruit passage in the upper portion thereof discharging at its lower end into the grating, two spaced breaking cylinders in the upper portion of the passage, each cylinder being provided with breaker arms projecting radially therefrom and spaced to rotate through paths alternating with and laterally adjacent to the paths of the arms of the other cylinder, means for rotating said cylinders, rotatable devices for agitating fruit within and advancing it within the surrounding grating longitudinally thereof, means to rotate said devices at a higher rate of speed than that of the cylinders, and means for introducing water to the passage.

10. The combination of a frame structure having a cylindrical grating in the lower portion thereof and a downwardly directed fruit passage in the upper portion thereof discharging at its lower end into the grating, two spaced breaking cylinders in the upper portion of the passage, each cylinder being provided with breaker arms projecting radially therefrom and spaced to rotate through paths alternating with and laterally adjacent to the paths of the arms of the other cylinder, means for rotating said cylinders at different relative speeds, rotatable devices for agitating fruit within and advancing it within the surrounding grating longitudinally thereof, means to rotate said devices at a higher rate of speed than that of the cylinders, and means for introducing water to the passage.

In testimony whereof I affix my signature.

JAMES F. McGHEE.